Oct. 12, 1937.    H. G. KINDER    2,095,474
APPARATUS FOR AND METHOD OF SHAPING WIRE
Filed Sept. 13, 1935    3 Sheets-Sheet 3
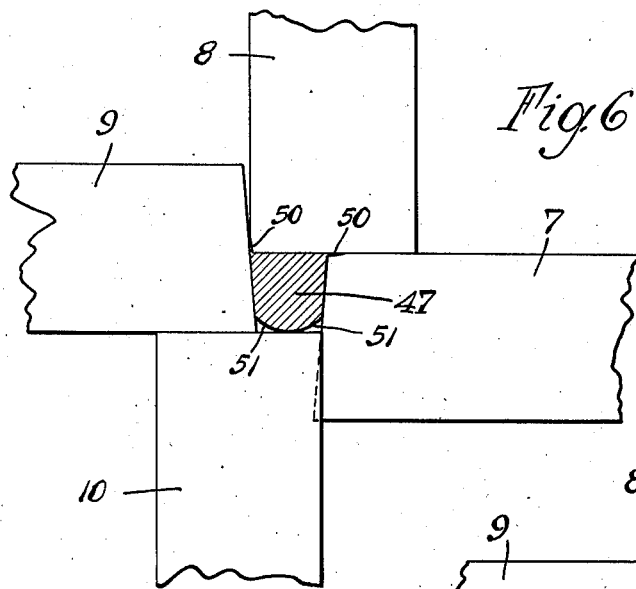
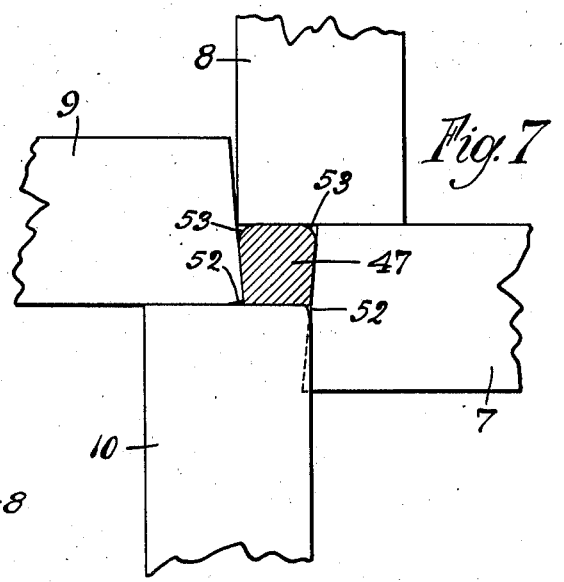
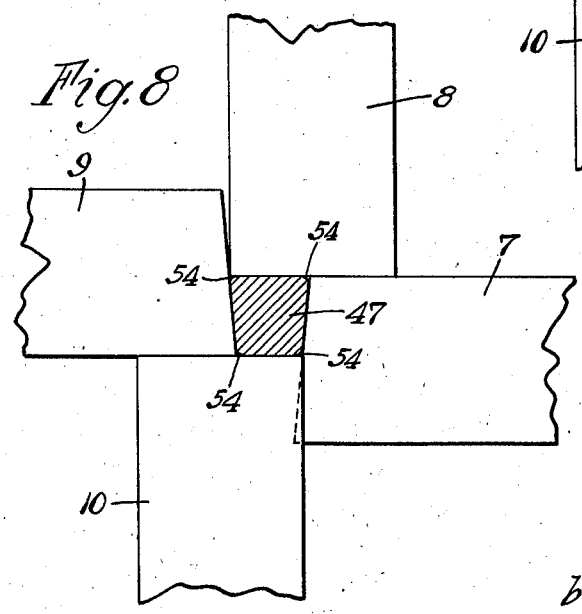
Inventor
Halsey G. Kinder
by Parker & Carter
Attorneys.

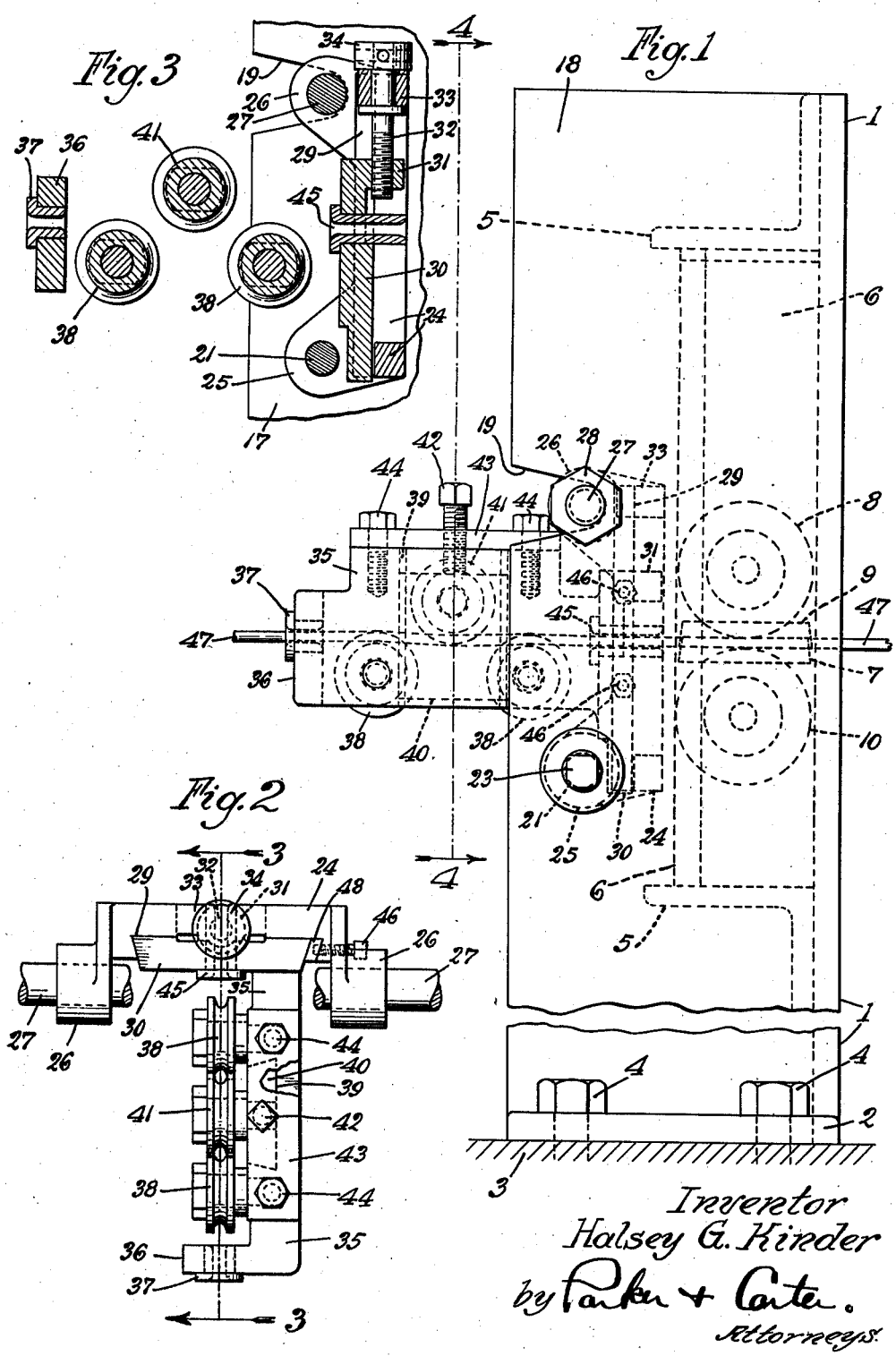

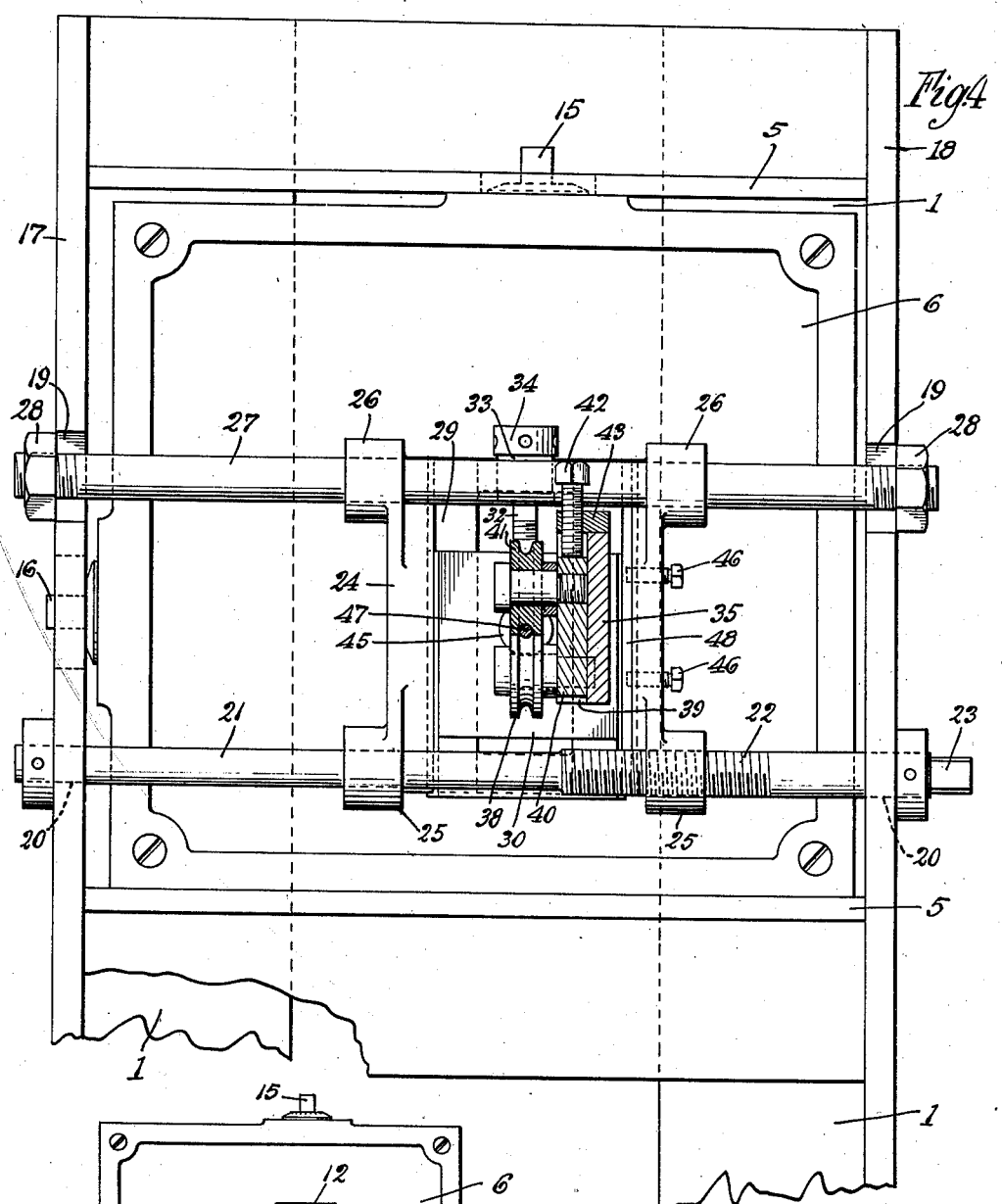

Patented Oct. 12, 1937

2,095,474

UNITED STATES PATENT OFFICE 2,095,474

APPARATUS FOR AND METHOD OF SHAPING WIRE

Halsey G. Kinder, Kenosha, Wis., assignor to Macwhyte Company, Kenosha, Wis., a corporation of Illinois Application September 13, 1935, Serial No. 40,424

12 Claims. (Cl. 80—40)

This invention relates to an apparatus and to a method for forming and shaping wire and has for one object to provide a controlling means whereby wire of any cross section may be rolled accurately to any desired shape. Another object is to provide means whereby such a wire may be rolled accurately to shape in a "Turk's head" of standard construction. Another object of the invention is to provide a controlling apparatus and method for use in connection with a "Turk's head" for controlling and varying the cross section of wire.

Other objects will appear from time to time in the specification and claims.

The mechanism of the invention is illustrated more or less diagrammatically in the accompanying drawings, wherein:—

Figure 1 is a side elevation with parts broken away showing an apparatus suitable for carrying out the process, in position of use;

Figure 2 is a plan view of the wire controlling apparatus with parts broken away and parts omitted;

Figure 3 is a longitudinal vertical section taken at line 3—3 of Figure 2;

Figure 4 is an end elevation of the apparatus with parts in section at line 4—4 of Figure 1;

Figure 5 is an elevation of one form of "Turk's head";

Figure 6 is a diagram illustrating the effect upon an unguided or improperly guided wire;

Figure 7 is a similar diagram;

Figure 8 is a diagram illustrating the effect of properly guiding the wire.

Like parts are designated by like characters throughout the specification and drawings.

1 designates generally a frame which may be provided with one or more foot members 2 to rest upon a floor or foundation 3, to which the frame is attached by screws 4 or otherwise. The frame may conveniently be supplied with a pair of horizontal members 5, 5, upon which a "Turk's head" is positioned. The Turk's head may be of any desired form and its particular details form no essential part of the present invention. Turk's heads in general are used for forming, shaping and drawing wires and the present invention may be used in connection with almost any type of Turk's head.

As shown, 6 indicates generally the frame of a Turk's head in which four rollers 7, 8, 9, 10 are positioned. Individual capstan screws may be provided for each of the rollers. As indicated there are capstan screws 11, 12, 13 and 14, one for each of the rollers 7, 8, 9 and 10, respectively.

Further adjusting means may be provided, for example, screws 15 and 16, for the rollers 8 and 9, respectively. As above mentioned, the invention may be used with almost any form of Turk's head. In general a Turk's head comprises four rollers which may be of different shapes but which together define a space through which the wire passes, contacting all four rollers. The shapes of the rollers are such that wire is changed in shape as it is drawn through the Turk's head and various adjustments are provided to vary the relative position of the rollers. In the form shown herewith only one typical form of Turk's head is shown, although others might be substituted.

The frame 1 may be provided with side flanges 17, 18. These are notched as at 19 and perforated as at 20. In the perforations 20 is positioned a supporting and adjusting screw 21 which is threaded as at 22 and squared as at 23 for ready rotation. A wire guide bracket 24 is provided with pairs of perforated lugs 25, 25 and 26, 26. The lugs 25, 25 engage the adjusting screw 21. One of the lugs is threaded to engage the threading 22 of the screw. The other lug is preferably not threaded and can slide freely upon the member 21. The perforated lugs 26 engage a supporting rod 27 which, when the wire guide bracket is in working position, lies within the notches 19 in the flanges 17, 18 and is locked in place by nuts 28 or otherwise. Ordinarily the member 27 is smooth and the lugs slide freely upon it.

The wire guide bracket 24 is provided with a dovetailed slot 29 to receive a wire guide block 30. At its upper end the block is provided with a threaded lug 31 which receives the threaded end of an adjusting screw 32. This screw passes through a portion 33 of the wire guide bracket 24 and at its upper end may carry a capstan screw 34 or any other means by which it may be readily rotated to move the wire guide block up and down in the dovetailed groove or guide 29. Preferably formed integrally with the wire guide block 30 is an arm 35 laterally bent as at 36, to carry a wire guide 37. Supported from the arm 35 in suitable bearings are two flanged rollers 38, 38. The arm 35 is provided with a dovetailed slot or guide 39 within which a dovetailed bearing block 40 is positioned for adjusting movement. This block carries upon a suitable bearing a flanged roller 41. The adjustable block 40 is normally held in raised position by the wire when the apparatus is in use. It may be adjusted downwardly by a screw 42 which is in threaded engagement with the perforation formed in a plate 43 which plate is secured to the top of the arm 35 by screws 44 or otherwise. When the apparatus is not in use and when no wire is passing through, the block 40, carrying the roller 41, may be held from dropping out either by a stop or by the fact that the clearance between the rollers 38 is less than the diameter of the roller 41. The wire guide block 30 carries a wire guide 45 which may be of the same size and shape as the wire guide 37 and is placed generally in line with it. One or more set screws 46 may be arranged to pass through the wire guide bracket 24 and to bear against a wedge 48, which in turn is in contact with the wire guide block 30. Thus the set screws 46 are effective to lock the wire guide block in suitable adjusted position, to which it has been moved by rotation of the capstan screw 34.

Where in the claims it has been stated that the mechanism of the invention is used for forming shapes "having converging sides" this language is to be taken as meaning shapes generally such as those shown in Figures 6, 7 and 8. One side may be inclined or several sides may be inclined, and while the shape is generally what is likely to be called "keystone" the invention is not limited to just that shape.

The use and operation of the invention are as follows:

If it be assumed that wire of whatever shape is to be drawn and is to be given by the Turk's head, or otherwise, an angular cross section so that it has at least two converging sides and is to take, for example, a "keystone" shape, at least two of the rollers of the Turk's head will be given the angular faces shown in the rollers 7 and 9 in Figure 5. The parts will be in the position shown in the drawings. The wire guide assembly is held in the upright position, the member 27 fitting into the slots 19 and being held in position by the nuts 28. A wire 47 is passed through the guide 37, passed between the rollers 38 and 41, through the guide 45 and through the rollers of the Turk's head. The wire guiding assembly is adjusted laterally with respect to the Turk's head by the rotation of the screw 22 and is adjusted vertically by rotation of the capstan screw 34. The roller 41 is adjusted by means of the screw 42 to the desired position with respect to the rollers 38. The rollers 38 and 41 in general serve the purpose of straightening the wire. With the parts in the position shown and described, the wire is drawn through the Turk's head, being shaped by its rollers.

It has been found in the past that in many wire drawing operations, where wire is to be given a keystone or similar shape, there is a tendency, if the wire is unguided or if it is inaccurately guided, for the wire to crowd or be forced by the slope of the rollers so that it does not fully fill the space between the rollers of the Turk's head. The result is that the wire is inaccurately shaped or is not uniformly shaped and the product is unsatisfactory. This effect can be entirely prevented and the wire can be given a satisfactory and a uniform shape by means of the wire guiding assembly. Lateral or vertical adjustment is carried out by the adjusting means shown so that the wire is moved sufficiently out of line with the space between the rollers of the Turk's head to give a guiding effect and the crowding and other unsatisfactory results are prevented. The device in this sense may be called an "uncentering device"; a guide which merely centers the wire accurately with respect to the space between the rollers of the Turk's head fails entirely to produce the desired result and in making the more difficult shapes it is essential to uncenter the wire by moving it up, down, to the right or the left with respect to the Turk's head, so that it is positively moved out of center and in the necessary direction and to the necessary degree to give a slight initial bend to the wire as it is drawn through the Turk's head to counteract the undesirable crowding effect previously mentioned. When the proper adjustment has been made, depending upon the size and quality of the wire and on the shape to which it is to be drawn, the wire guiding assembly is locked in adjusted position and an accurate and uniform product is produced by the drawing of the wire through the Turk's head.

While a Turk's head has been shown and spoken of, it is to be understood that other forms of wire shaping and drawing apparatus may be used with my wire guiding assembly with equally satisfactory results and the invention is not limited, therefore, to the combination of a wire guide assembly with a Turk's head and my "uncentering" apparatus and my process of holding the wire out of center during the drawing operation may be applied in connection with any form of wire shaping or drawing apparatus. The wire drawn and shaped with my apparatus and according to my method may be of any desired cross section before drawing.

The effect on the wire of drawing it without guiding or when improperly guided has been spoken of above. It produces, as pointed out above, an unsatisfactory wire in which crowding and mis-shaping occur. This effect is illustrated in Figures 6, 7 and 8. As illustrated in those figures, 7, 9 are the rollers having tapered faces and 8 and 10 are the rollers having straight or flat faces. In Figure 6 the wire has been permitted to crowd upwardly. This is the result which ordinarily occurs in the use of a Turk's head where there is no guiding or no adequate guide. The inclination of the tapered rollers when the wire is subjected to pressure causes the wire to crowd toward the wider end of the cavity and thus the wire 47, as shown in Figure 6, has crowded upwardly, forming fins 50, 50 and has moved out of contact with the rollers at the lower or narrower end of the cavity causing rounded portions 51, 51 to be formed, thus obviously making a wire which does not have the desired cross section and which is unsatisfactory and unusable.

As shown in Figure 7 a result which is the reverse of that shown in Figure 6 has occurred. The wire has been forced too low. This can occur accidentally or because of defective positioning of the rolls 38 and 41 or for many other reasons, and when it occurs, fins 52, 52 are formed at the narrow end of the cavity between the rollers and the rounded portions 53, 53 occur at the wider end. This is a condition just as unsatisfactory as that shown in Figure 6.

In Figure 8 a wire which has been properly guided is shown. For most purposes this means that the wire guide 45 will be held slightly below the center of the contour of the rollers, that is to say, slightly below the center of the cavity defined by the rollers, to resist the tendency of the flow of metal in the wire which would otherwise force itself into the area of less compression, that is to say, upwardly to the wider portion of the cavity to produce the effect shown in Figure 6. As a result of this proper guiding the wire has slightly and equally formed corners 54 and thus as a result of my method and apparatus for "uncentering" the wire is guided to produce a satisfactory product of uniform contour and cross section and this method is successful commercially for making wires of almost every desired contour, where in the past additional drawing after the first passage through the rolls has been necessary in order to correct the defective results such as those shown in Figures 6 and 7, which have heretofore been considered unavoidable.

I claim:

1. In a wire forming machine for forming wire into shapes having converging sides, a wire forming assembly, and a wire guiding means, adjustment means for said guiding means, whereby the latter is moved and held out of alignment with respect to the forming means.

2. In a wire forming machine for forming wire into shapes having converging sides, a wire straightening and a wire forming assembly, and a wire guiding means between the two, adjustment means for said guiding means, whereby the latter is moved and held out of alignment with respect to the forming means.

3. In combination with a wire forming means, having an opening through which wire is drawn, an adjustable wire guiding means positioned to guide the wire as it moves to said forming means, and to hold the wire out of alignment with said opening.

4. In a wire drawing mechanism, means comprising a Turk's head for shaping a wire which is drawn therethrough, wire guiding means, and adjustment means for said guiding means, whereby the latter is adjusted and held out of alignment with respect to the Turk's head.

5. In a wire drawing mechanism for forming wire into shapes having converging sides, means comprising a Turk's head for shaping a wire which is drawn therethrough, means for straightening the wire before it reaches the Turk's head, and guiding means between the straightening means and the Turk's head, and adjustment means for said guiding means, whereby the latter is adjusted and held out of alignment with respect to the Turk's head.

6. In combination in a wire forming machine for forming wire into shapes having converging sides, a plurality of rollers positioned with their edges adjacent each other and defining a space through which the wire is drawn and in which it is shaped, and a wire guiding means, adjustment means for said guiding means, whereby the latter is moved and held out of alignment with said wire forming space.

7. In combination in a wire forming machine for forming wire into shapes having converging sides, a plurality of rollers positioned with their edges adjacent each other and defining a space through which the wire is drawn and in which it is shaped, and a wire guiding means, adjustment means for said guiding means, whereby the latter is moved laterally and held out of alignment with said wire forming space.

8. In combination in a wire forming machine for forming wire into shapes having converging sides, a plurality of rollers positioned with their edges adjacent each other and defining a space through which the wire is drawn and in which it is shaped, a wire straightening means adjacent said rollers, and a wire guiding means between said straightening means and said rollers, adjustment means for said guiding means, whereby the latter is moved and held out of alignment with said wire forming space.

9. The method of shaping wire which comprises the following steps: passing the wire through a forming member, and guiding the wire out of center, while in the forming member, out of alignment with said forming member.

10. The method of shaping wire which comprises the following steps: straightening the wire, passing it through a forming member, and guiding the wire out of center, while in the forming member, out of alignment with said forming member.

11. The method of shaping a wire which comprises the following steps: passing the wire through an opening of the desired shape, guiding the wire out of center while in said opening and holding the wire as it moves to said opening out of alignment therewith.

12. The method of shaping a wire which comprises the following steps: passing the wire through a forming cavity formed of a plurality of rotary elements, guiding the wire by rotary means to uncenter it with respect to the forming cavity as it moves to and while it lies within said cavity.

HALSEY G. KINDER.